United States Patent [19]

Petraccoro

[11] Patent Number: 5,377,416
[45] Date of Patent: Jan. 3, 1995

[54] HACKSAW

[76] Inventor: Mark A. Petraccoro, 350 Queen Haven Rd., Hubert, N.C. 28539

[21] Appl. No.: 186,992

[22] Filed: Jan. 27, 1994

[51] Int. Cl.⁶ .............................................. B23D 49/12
[52] U.S. Cl. ......................................... 30/517; 30/344
[58] Field of Search ................ 30/517, 518, 519, 520, 30/521, 522, 523, 524, 525, 344; 16/110 R, 114 R

[56] References Cited

U.S. PATENT DOCUMENTS

| D. 245,754 | 9/1977 | Breger . | |
|---|---|---|---|
| D. 307,536 | 5/1990 | Alm . | |
| 2,016,107 | 10/1935 | Forsberg | 30/517 |
| 2,137,800 | 11/1938 | Davey | 30/517 |
| 2,282,902 | 5/1942 | Sultan | 30/519 |
| 2,452,148 | 10/1948 | Rhodes | 30/517 |
| 2,996,091 | 8/1961 | Snook | 30/517 |
| 3,347,292 | 10/1967 | Morgan, Jr. | 30/525 |
| 3,480,055 | 11/1969 | La Pointe | 30/517 |
| 3,602,278 | 8/1971 | Brucken . | |
| 4,376,456 | 3/1983 | Jacoff . | |
| 4,381,024 | 4/1983 | Dreier . | |
| 4,411,068 | 10/1983 | Theodorides | 30/517 X |

FOREIGN PATENT DOCUMENTS 881650  11/1961  United Kingdom ................ 30/517

*Primary Examiner*—Rinaldi I. Rada

[57] ABSTRACT

A hacksaw blade has an outer free end and an inner end, with the inner end arranged for reception within a pistol grip handle and secured thereto to provide for case of manipulation of the hacksaw in use.

1 Claim, 2 Drawing Sheets

HACKSAW

BACKGROUND OF THE INVENTION

1. Field of the Invention

The field of the invention relates to hacksaw structure, and more particularly pertains to a new hacksaw wherein the same provides a pistol grip handle to provide for case of manipulation of the hacksaw relative to areas of limited access.

2. Description of the Prior Art

The prior art relating to hacksaw support structure and the like has typically employed hacksaw blades relative to a handle structure such as exemplified in U.S. Pat. No. 4,376,456. In addition, U.S. Design Pat. No. 307,536 indicates a hacksaw blade of longitudinal handle construction to receive the hacksaw blade.

The instant invention attempts to overcome deficiencies in the prior art by employing a pistol grip structure which provides for enhanced leverage in manipulation of the hacksaw into tight or restricted areas. In this respect, the present invention substantially fulfills this need.

SUMMARY OF THE INVENTION

In view of the disadvantages inherent in the known types of hacksaw apparatus now present in the prior art, the present invention provides a hacksaw wherein the same is arranged to mount a hacksaw blade within a pistol grip construction. As such, the general purpose of the present invention, which will be described subsequently in greater detail, is to provide a new hacksaw apparatus and method which has many of the advantages of the prior art listed heretofore and many novel features that result in a hacksaw apparatus which is not anticipated, rendered obvious, suggested, or even implied by any of the prior art, either alone or in any combination thereof.

To attain this, the present invention provides a hacksaw blade having an outer free end and an inner end, with the inner end arranged for reception within a pistol grip handle and secured thereto to provide for case of manipulation of the hacksaw in use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hacksaw apparatus and method which has many of the advantages of the prior art listed heretofore and many novel features that result in a hacksaw apparatus which is not anticipated, rendered obvious, suggested, or even implied by any of the prior art, either alone or in any combination thereof.

It is another object of the present invention to provide a new hacksaw which may be easily and efficiently manufactured and marketed.

It is a further object of the present invention to provide a new hacksaw which is of a durable and reliable construction. An even further object of the present invention is to provide a new hacksaw which is susceptible of a low cost of manufacture with regard to both materials and labor, and which accordingly is then susceptible of low prices of sale to the consuming public, thereby making such hacksaws economically available to the buying public.

Still yet another object of the present invention is to provide a new hacksaw which provides in the apparatuses and methods of the prior art some of the advantages thereof, while simultaneously overcoming some of the disadvantages normally associated therewith.

It is a further object of the present invention to provide a new hacksaw which has a pistol grip handle secured thereto to provide for ease of manipulation of the hacksaw in use.

An even further object of the present invention to provide a new hacksaw which includes a mounting bore in the handle thereof wherein the portion of the handle including the mounting bore protrudes rearwardly to provide a stop on the handle to facilitate comfortable and safe gripping of the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
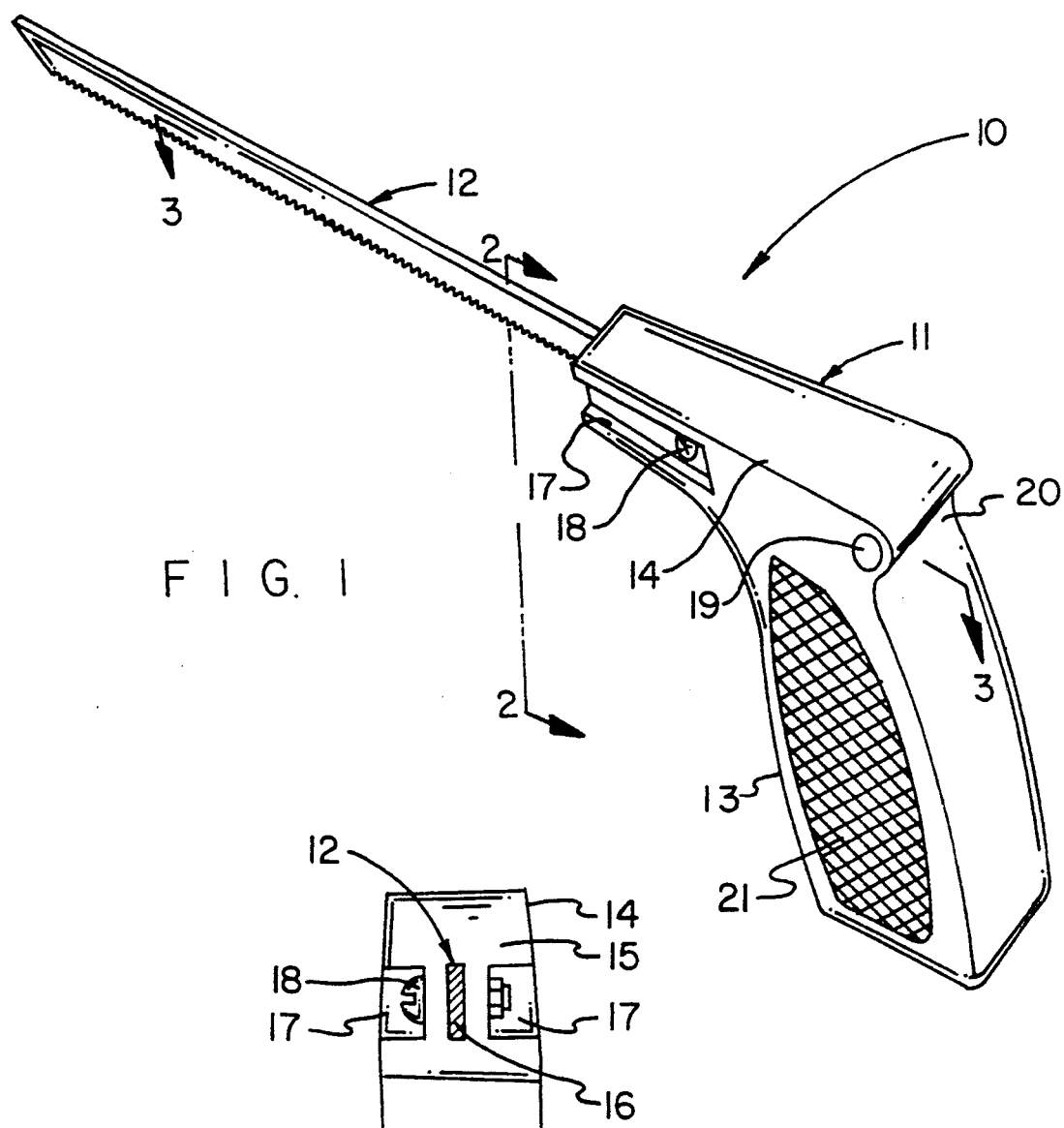
FIG. 1 is an isometric illustration of the invention.
Figure 2:
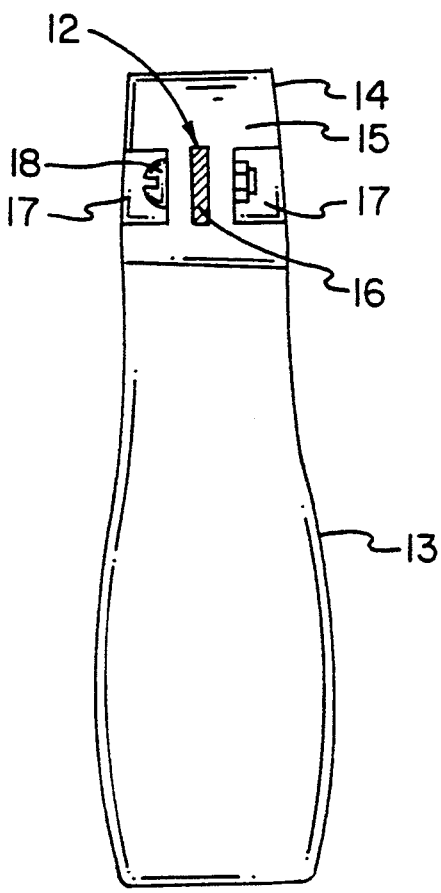
FIG. 2 is a cross sectional view of the invention taken along the lines 2—2 of FIG. 1 in the direction indicated by the arrows.

With reference now to the drawings, and in particular to FIGS. 1-4 thereof, a new hacksaw embodying the principles and concepts of the present invention and generally designated by the reference numeral 10 will be described.

Figure 3:
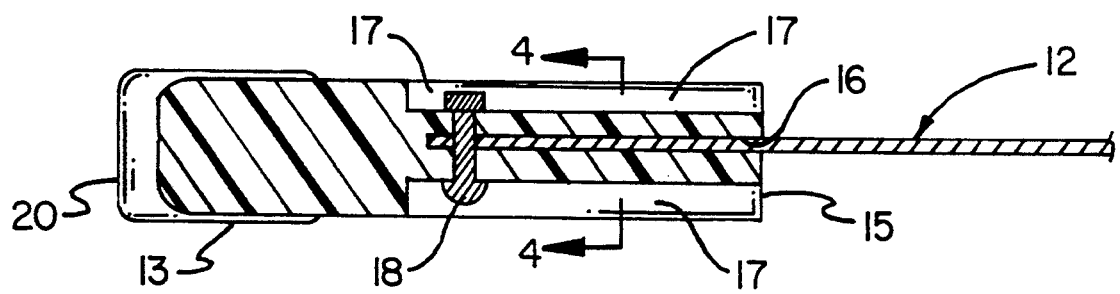
FIG. 3 is a further cross sectional view, taken along the lines 3—3 of FIG. 1 in the direction indicated by the arrows.
Figure 4:
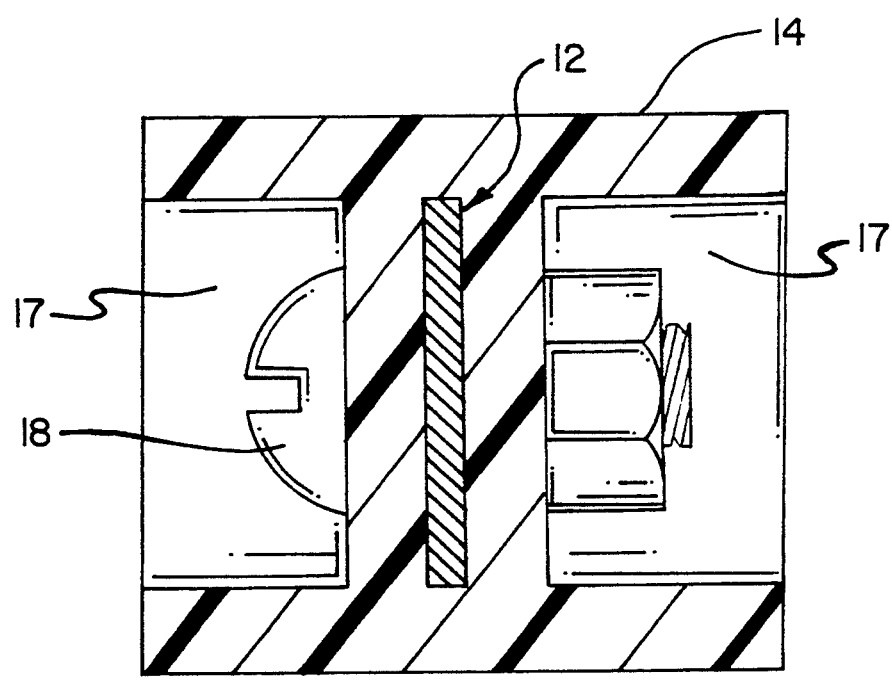
FIG. 4 is an even further cross sectional view, taken along the lines 4—4 of FIG. 3 in the direction indicated by the arrows.

More specifically, the hacksaw 10, as indicated in FIG. 1, includes an L-shaped handle 11 including a handle body 13 with a handle head 14 substantially orthogonally mounted to the handle body 13. A hacksaw blade 12 is received through a handle head front wall 15 and secured thereto by a fastener 18. More specifically and as shown in FIG. 3, a slot 16 is directed through the head front wall 15 which allows the blade 12 to be received therewithin. Further, the handle head 14 is shaped so as to define side walls, with each of the side walls having a side wall recess 17 such that the fastener 18 directed through the handle head and the hacksaw blade 12 is recessed below the exterior surface of the side walls to prevent unintentional contact therewith by a user.

The handle 11 includes a knurled surface 21 which extends along a portion of the handle body 13 to enhance gripping of the device 10. In addition, a mounting bore 19 is directed through the handle head 14 and positioned spaced from the slot 16 and adjacent the head rear wall 20. The mounting bore 19 is arranged to permit mounting of the hacksaw 10 on a support rod such as a nail and the like. In addition, the mounting bore 19 extends through a portion of head rear wall 20 which protrudes rearwardly as best seen in FIG. 1 to form a stop projection engageable by the top portion of the hand of the user which stop portion further facilitates comfortable gripping of the handle and of the hacksaw blade mounted thereon.

In use, the hacksaw 10 allows a user to cut and shape materials which are located in hard-to-reach or tight areas. Because the hacksaw blade 12 is mounted at one end thereof only, the device 10 permits flexing of the blade around corners or obstructed areas.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A hacksaw assembly, comprising:
   an elongate hacksaw blade having a blade first end spaced from a blade second end;
   an L-shaped handle, the L-shaped handle including a handle body and a handle head obliquely mounted to the handle body, with the handle head having a head front wall spaced from a head rear wall, and spaced head side walls, the head front wall having a slot formed therewithin which receives the hacksaw blade first end, each of said side walls including a recess coextensive and aligned to flank said slot, said recesses extending from said head front wall, said handle body having a knurled surface formed along at least a portion of said handle body to enhance gripping of the device, said handle head having a stop protection formed at said head rear wall along a juncture of said handle head with said handle body, said handle head having a mounting bore directed through said stop projection to permit mounting of the hacksaw on a support rod; and,
   a fastener member positioned within the recess and directed through both side walls and the hacksaw blade to secure the blade within the slot.

* * * * *